(12) United States Patent
Yamano (10) Patent No.: US 10,601,328 B2
(45) Date of Patent: Mar. 24, 2020

(54) POWER CONVERSION DEVICE

(71) Applicant: Mitsubishi Electric Corporation, Tokyo (JP)

(72) Inventor: Masayuki Yamano, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 0 days.

(21) Appl. No.: 16/330,124

(22) PCT Filed: Feb. 2, 2017

(86) PCT No.: PCT/JP2017/003759
§ 371 (c)(1),
(2) Date: Mar. 4, 2019

(87) PCT Pub. No.: WO2018/083813
PCT Pub. Date: May 11, 2018

(65) Prior Publication Data
US 2019/0252987 A1    Aug. 15, 2019

(30) Foreign Application Priority Data
Nov. 1, 2016  (JP) .................................. 2016-214081

(51) Int. Cl.
*H02M 3/335* (2006.01)
*H02M 1/08* (2006.01)
(Continued)

(52) U.S. Cl.
CPC ......... *H02M 3/33569* (2013.01); *H02J 1/108* (2013.01); *H02J 1/12* (2013.01);
(Continued)

(58) Field of Classification Search
CPC ........ H02M 3/22; H02M 3/325; H02M 3/335; H02M 3/33507; H02M 3/3353;
(Continued)

(56) References Cited

U.S. PATENT DOCUMENTS

| 5,949,667 A | 9/1999 | Libert |
| 2001/0012207 A1* | 8/2001 | Nomura ............ H02M 3/33569 363/17 |

(Continued)

FOREIGN PATENT DOCUMENTS

| FR | 2 763 781 A1 | 11/1998 |
| JP | 59-059075 A | 4/1984 |

(Continued)

OTHER PUBLICATIONS

Japanese Office Action of JP 2016-214081, dated Jun. 20, 2017.
(Continued)

*Primary Examiner* — Adolf D Berhane
(74) *Attorney, Agent, or Firm* — Sughrue Mion, PLLC; Richard C. Turner (57) ABSTRACT

A first DC-DC conversion circuit and a second DC-DC conversion circuit, which are connected in parallel to one casing, are caused to operate independently of each other, whereby even in the event that a semiconductor switching element which configures either the first or second DC-DC conversion circuit fails, only a DC-DC conversion circuit which carries out a normal operation is caused to operate, thereby carrying out the continuation of power supply of a power conversion device.

16 Claims, 5 Drawing Sheets

(51) Int. Cl.
*H02M 1/32* (2007.01)
*H02J 1/12* (2006.01)
*H02M 3/337* (2006.01)
*H02M 3/28* (2006.01)
*H02J 1/10* (2006.01)
*H02M 1/00* (2006.01)

(52) U.S. Cl.
CPC ............... *H02M 1/08* (2013.01); *H02M 1/32* (2013.01); *H02M 3/28* (2013.01); *H02M 3/285* (2013.01); *H02M 3/3378* (2013.01); *H02M 3/33561* (2013.01); *H02M 2001/007* (2013.01); *H02M 2001/0058* (2013.01); *H02M 2001/325* (2013.01)

(58) Field of Classification Search
CPC ......... H02M 3/33569; H02M 3/33592; H02M 1/08; H02M 1/088; H02M 1/096; H02M 1/32; H02M 2001/0058; H02M 2001/325
See application file for complete search history.

(56) References Cited

U.S. PATENT DOCUMENTS

| | | | |
|---|---|---|---|
| 2011/0051468 A1* | 3/2011 | Kyono | H02M 3/285 363/21.02 |
| 2013/0100707 A1 | 4/2013 | Hatakeyama et al. | |
| 2014/0266074 A1* | 9/2014 | Herber | H02J 7/007 320/166 |
| 2015/0092452 A1 | 4/2015 | Hatakeyama et al. | |
| 2015/0229218 A1* | 8/2015 | Hosoda | H02M 3/33507 363/21.01 |
| 2016/0226396 A1* | 8/2016 | Hattori | H02M 7/003 |
| 2017/0302210 A1* | 10/2017 | Dorothy | H02P 27/06 |
| 2019/0131874 A1* | 5/2019 | Saga | H02M 3/33561 |

FOREIGN PATENT DOCUMENTS

| | | |
|---|---|---|
| JP | 61-189167 A | 8/1986 |
| JP | 09-204240 A | 8/1997 |
| JP | 2009-254082 A | 10/2009 |
| JP | 2010-158098 A | 7/2010 |
| JP | 2013-212011 A | 10/2013 |
| JP | 5590124 B2 | 9/2014 |
| JP | 2015-053746 A | 3/2015 |

OTHER PUBLICATIONS

Japanese Office Action of JP 2016-214081, dated Jan. 9, 2018.
International Search Report for PCT/JP2017/003759 dated Mar. 7, 2017 (PCT/ISA/210).
Communication dated Oct. 9, 2019 from European Patent Office in counterpart EP Application No. 17866742.4.

* cited by examiner

POWER CONVERSION DEVICE

CROSS REFERENCE TO RELATED APPLICATIONS

This application is a National Stage of International Application No. PCT/JP2017/003759 filed Feb. 2, 2017, claiming priority based on Japanese Patent Application No. 2016-214081 filed Nov. 1, 2016.

BACKGROUND OF THE INVENTION

Field of the Invention

The present application relates to a power conversion device using semiconductor elements, and particularly to a power conversion device which can carry out the continuation of power supply even in case of failure.

Description of the Related Art

A power conversion device, being used for various purposes, not only requires a reduction in size and an increase in efficiency, but, from the perspective of functional safety, is required to have a minimum function even in the event that the power conversion device fails. For example, Japanese Patent No. 5,590,124 (PTL 1) discloses a power conversion circuit which enables a highly efficient power supply regardless of the amount of power supply to a load.

[PTL 1] Japanese Patent No. 5,590,124

The power conversion circuit disclosed in PTL 1 is highly efficient regardless of the amount of power supply to the load, but has a problem in that the circuit is mounted on a power conversion device for electric vehicle use, and when the circuit fails and stops the output while the electric vehicle is moving, the power supply from, the power conversion device to the electric vehicle is cut off, bringing the electric vehicle to a sudden stop, thereby causing an impact accident of vehicles.

SUMMARY OF THE INVENTION

The present application has been made to solve the above problem, and an object of the present application is to provide a power conversion device which can carry out the continuation of power supply even when a failure occurs.

The power conversion device disclosed in the present application includes a plurality of power conversion circuits which are provided inside an identical casing and connected in parallel to each other; a controller which carries out the control of the plurality of power conversion circuits; and a control power supply which carries out the supply of power to the controller, wherein the plurality of power conversion circuits each include a transformer having a primary winding and a secondary winding; semiconductor switching elements connected to the primary winding; rectifier circuits connected to the secondary winding; a smoothing reactor connected to the output side of the rectifier circuits; and a smoothing capacitor connected between the smoothing reactor and the ground, and wherein the plurality of power conversion circuits operate independently of each other.

According to the power conversion circuit disclosed in the present application, a plurality of power conversion circuits which can operate independently of each other are provided in parallel, and thereby it is possible, even when an element configuring any one of the power conversion circuits fails, to continue the operation of the power conversion device without stopping the operation thereof.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereafter, a description will be given, referring to the drawings, of preferred embodiments of a power conversion device disclosed in the present application. In the individual drawings, identical or equivalent portions are given identical signs, thus omitting a redundant description.

First Embodiment

Figure 1:
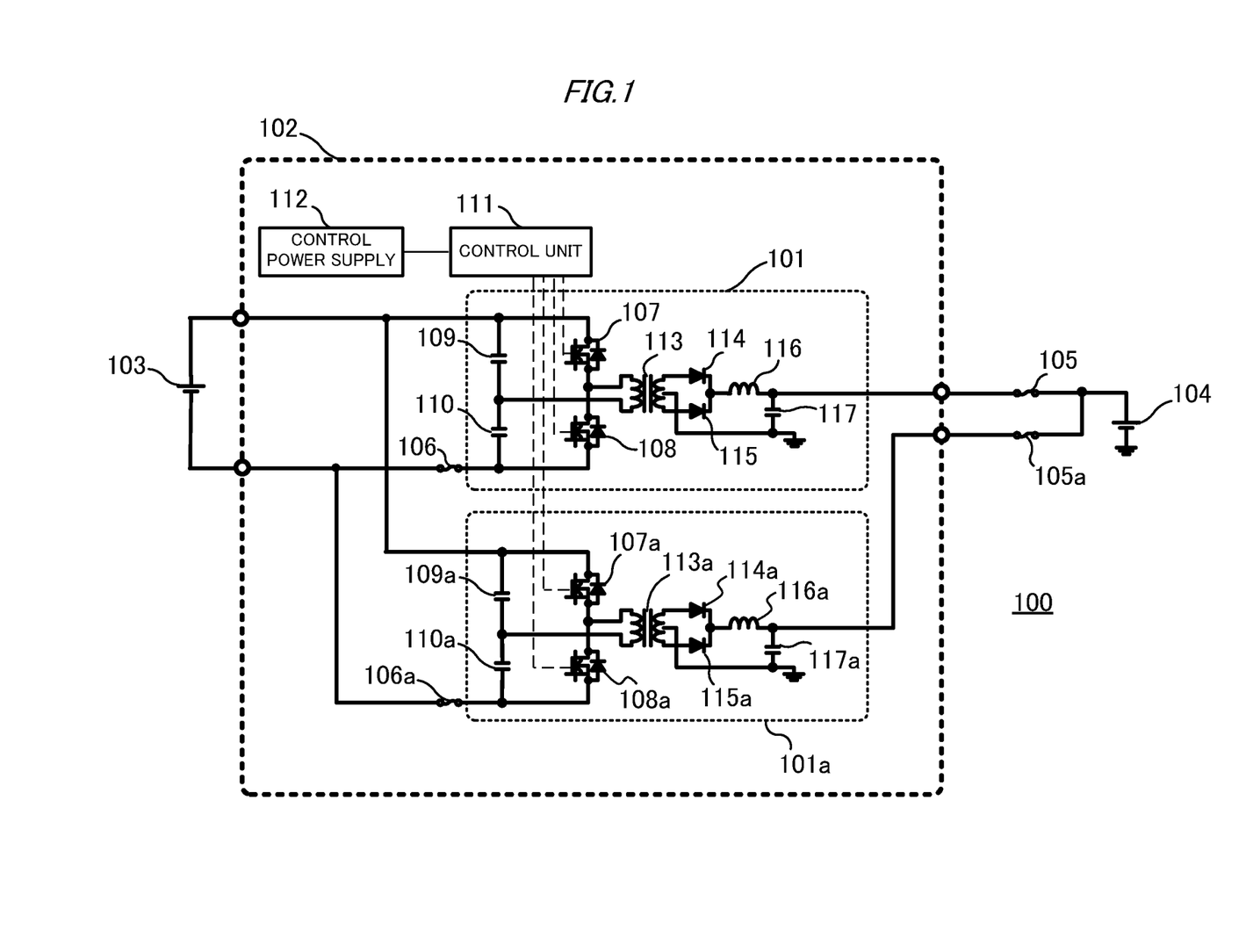
FIG. 1 is a schematic configuration diagram showing a power conversion device according to the first embodiment.

FIG. 1 is a schematic configuration diagram showing a power conversion device according to the first embodiment. In a power conversion device 100 according to the first embodiment, a first DC-DC conversion circuit 101, which is a first power conversion circuit, and a second DC-DC conversion circuit 101a, which is a second power conversion circuit, are provided connected in parallel inside one casing 102. Also, the power conversion device 100 includes a DC power supply 103 connected to the respective primary sides of the first and second DC-DC conversion circuits 101, 101a, a load 104 (for example, a battery) connected to the respective secondary sides of the first and second DC-DC conversion circuits 101, 101a, and fuses 105, 105a which are connected between the respective secondary sides of the first and second DC-DC conversion circuits 101, 101a and the load 104. Furthermore, fuses 106, 106a are connected between the respective primary sides of the first and second DC-DC conversion circuits 101, 101a and the casing 102.

The first DC-DC conversion circuit 101 is of a half-bridge type circuit configuration using semiconductor switching elements (hereafter, switching elements) 107, 108, and resonance capacitors 109, 110 are connected in parallel to the respective switching elements 107, 108.

The switching elements 107, 108 are each on/off controlled by a control unit 111, and the control unit 111 is supplied with power by a control power supply 112. The control method of the control unit 111 adopts a hard-switching method.

Also, the primary side of a transformer 113 is connected to the switching elements 107, 108, and the secondary side is connected to rectifier elements 114, 115 which provide a rectifier circuit. One end of a smoothing reactor 116 is connected to the rectifier elements 114, 115, and the other end is connected to a smoothing capacitor 117. The smoothing capacitor 117 is connected between the smoothing reactor 116 and the ground. The smoothing reactor 116 and the smoothing capacitor 117 smooth the output currents of the rectifier elements 114, 115.

The second DC-DC conversion circuit 101a is of a half-bridge type circuit configuration using switching elements 107a, 108a, and resonance capacitors 109a, 110a are connected in parallel to the respective switching elements 107a. The switching elements 107a, 108a are each on/off controlled by the control unit 111, and the control unit 111 is supplied with power by the control power supply 112. The primary side of a transformer 113a is connected to the switching elements 107a, 108a, and the secondary side is connected to rectifier elements 114a, 115a which provide a rectifier circuit. One end of a smoothing reactor 116a is connected to the rectifier elements 114a, 115a, and the other end is connected to a smoothing capacitor 117a. The smoothing capacitor 117a is connected between the smoothing reactor 116a and the ground. The smoothing reactor 116a and the smoothing capacitor 117a smooth the output currents of the rectifier elements 114a, 115a.

The power conversion device 100 according to the first embodiment is configured as heretofore mentioned. Here, the control unit 111 carries out the on/off control of the switching elements 107, 108, 107a, 108a so as to enable the first and second DC-DC conversion circuits 101, 101a to operate independently of each other. Because of this, even in the event that a switching element which configures either the first or second DC-DC conversion circuit 101, 101a fails, only a DC-DC conversion circuit which carries out a normal operation is caused to operate, and thereby it is possible to realize the continuation of power supply of the power conversion device 100.

When the circuit configuration of the first and second DC-DC conversion circuits 101, 101a is of a half-bridge type, the resonance capacitors 109, 110, 109a, 110a are required as compared with in the case of, for example, a full-bridge type, but it is possible to reduce the number of switching elements, and possible to realize a reduction in the size and cost of the power conversion device 100.

Next, when the method of controlling the switching elements 107, 108, 107a, 108a is a hard-switching method, no resonance reactor or the like is used as compared with in the case of, for example, a soft-switching method, and so it is possible to carry out a reduction in the number of parts, and possible to realize a resulting reduction in the size and cost of the power conversion device 100.

Also, the control unit 111, in order maximize efficiency, causes the first and second DC-DC conversion circuits 101, 101a, which are connected in parallel, to operate with the load distributed into the two DC-DC conversion circuits, or causes only a specific DC-DC conversion circuit to operate and stops the other parallel-connected DC-DC conversion circuit, and thereby it is possible to realize an increase in the efficiency of the power conversion device 100.

Furthermore, the control unit 111 carries out the on/off control of the switching elements 107, 108, 107a, 108a with an interleaved drive so for example, to phase shift the output current of the second DC-DC conversion circuit 101a by 180 degrees with respect to the output current of the first DC-DC conversion circuit 101, and the currents distributed by interleaving are caused to converge outside the casing 102, thereby enabling a reduction of current ripples input into the load 104, while the fuses 105, 105a are provided, for example, between an interleaved junction and the casing 102, thereby eliminating the need to provide fuses on the output side of the power conversion device 100, and so it is possible to reduce the number of parts of the power conversion device 100, and possible to realize a reduction in the size of the power conversion device 100.

As in the power conversion device 100 according to the first embodiment, in a power conversion device 100 which, as a plurality of parallel-connected DC-DC conversion circuits are provided in one casing 102, is expected to increase in size due to an increase in the number of component parts, the switching elements 107, 108, 107a, 108a included in the first and second DC-DC conversion circuits 101, 101a are each configured of a wide band gap semiconductor using a silicon carbide- or gallium nitride-based material higher in switching speed than silicon, and thereby it is possible to realize a reduction in the size of the power conversion device 100.

The circuit configuration of the first and second DC-DC conversion circuits 101, 101a may be of a full-bridge type, and the method of controlling the switching elements with the control unit 111 may be a soft-switching method. Also, the control unit 111 may cause the currents distributed by interleaving to converge inside the casing 102, and a configuration may be such that the first and second DC-DC conversion circuits 101, 101a each independently include the control unit 111 and control power supply 112.

Second Embodiment

Next, a description will be given of a power conversion device according to the second embodiment.

Figure 2:
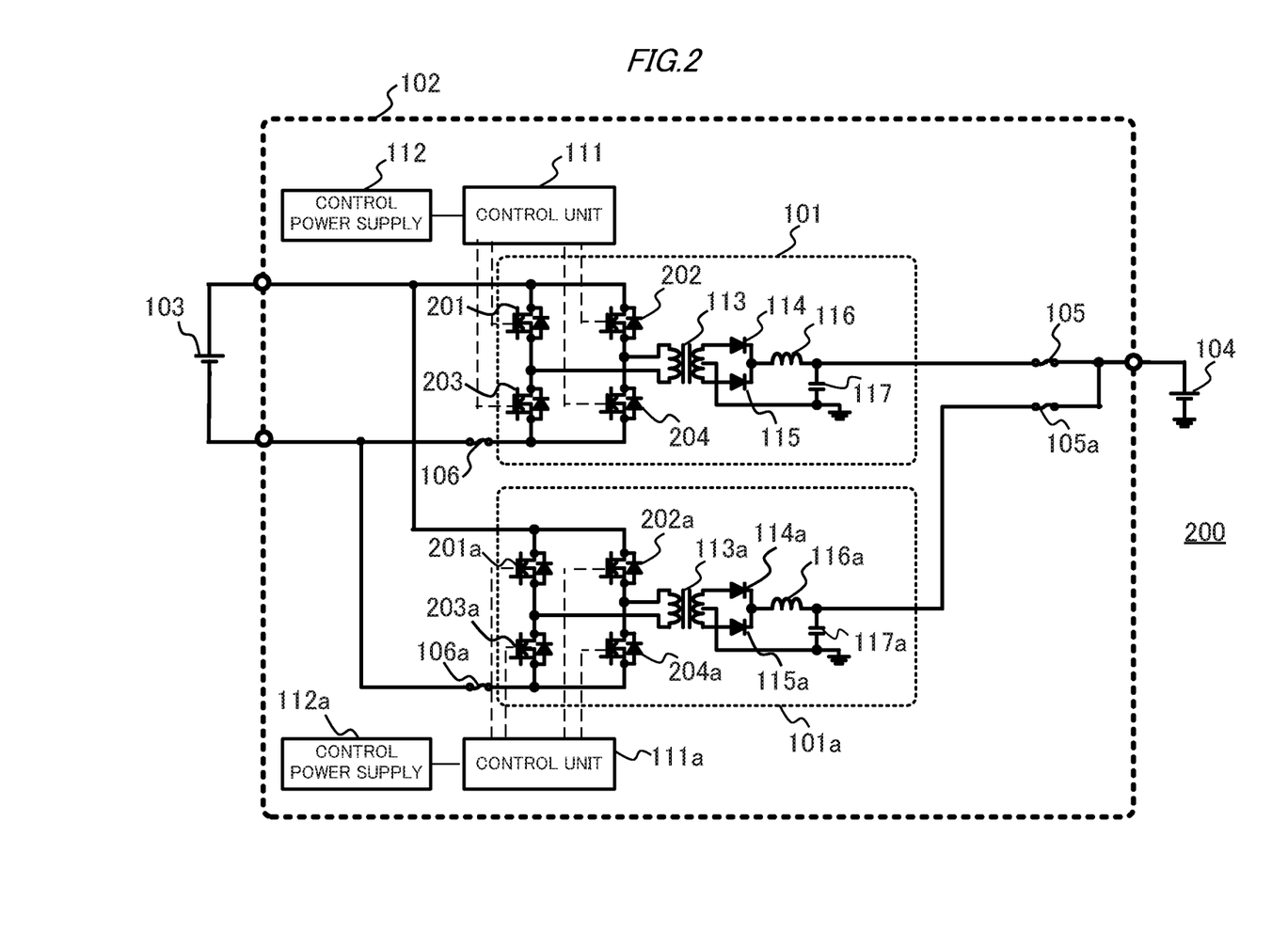
FIG. 2 is a schematic configuration diagram showing a power conversion device according to the second embodiment.

FIG. 2 is a schematic configuration diagram showing the power conversion device according to the second embodiment. In a power conversion device 200 according to the second embodiment, a first DC-DC conversion circuit 101, which is a first power conversion circuit, and a second DC-DC conversion circuit 101a, which is a second power conversion circuit, are provided connected in parallel inside one casing 102. The first DC-DC conversion circuit 101 being of a full-bridge type circuit configuration using switching elements 201, 202, 203, 204, the switching elements 201, 202, 203, 204 are each on/off controlled by a control unit 111, and the control unit 111 is supplied with power by a control power supply 112. The method of controlling the switching elements 201, 202, 203, 204 with the control unit 111 adopts a soft-switching method.

The second DC-DC conversion circuit 101a being of a full-bridge type circuit configuration using switching elements 201a, 202a, 203a, 204a, the switching elements 201a, 202a, 203a, 204a are each on/off controlled by a control unit 111a, and the control unit 111a is supplied with power by a control power supply 112a. The method of controlling the switching elements 201a, 202a, 203a, 204a with the control unit 111a adopts a soft-switching method. Also, fuses 105, 105a are provided inside the casing 102. The other components are the same as in the first embodiment, and the description thereof will be omitted.

The power conversion device 200 according to the second embodiment is configured as heretofore mentioned. Here, the control units 111, 111a carry out the on/off controls of the switching elements 201, 202, 203, 204, and 201a, 202a, 203a, 204a, respectively, so as to enable the first and second DC-DC conversion circuits 101, 101a to operate independently of each other. Because of this, even in the event that a switching element, a control unit, or a control power supply which configures either the first or second DC-DC conversion circuit 101, 101a fails, only a DC-DC conversion circuit which carries out a normal operation is caused to operate, and thereby it is possible to realize the continuation of power supply of the power conversion device 200.

When the circuit configuration of the first and second DC-DC conversion circuits 101, 101a is of a full-bridge type, it is possible to lower the currents flowing through the switching elements 201, 202, 203, 204, 201a, 202a, 203a, 204a as compared with in the case of, for example, a half-bridge type, and possible to realize a resulting increase in the efficiency of the power conversion device 200.

Next, when the method of controlling the switching elements 201, 202, 203, 204, and 201a, 202a, 203a, 204a with the respective control units 111, 111a is a soft-switching method, it is possible to reduce a switching loss as compared with in the case of, for example, a hard-switching method, and possible to realize a resulting increase in the efficiency of the power conversion device 200.

Also, the control units 111, 111a carry out the on/off controls of the switching elements 201, 202, 203, 204, and 201a, 202a, 203a, 204a, respectively, with an interleaved drive so as, for example, to phase shift the output current of the second DC-DC conversion circuit 101a by 180 degrees with respect to the output current of the first DC-DC conversion circuit 101, and the currents distributed by interleaving are caused to converge inside the casing 102, thereby enabling a suppression of heat generation of the power conversion device 200, as well as a reduction of output ripple currents, and as a result, it is possible to reduce the size of a smoothing capacitor 117 and thus to realize a reduction in the size of the power conversion device 200.

Also, as in the power conversion device 200 according to the second embodiment, in a power conversion device 200 which, as a plurality of parallel-connected DC-DC conversion circuits are provided in one casing 102, is expected to increase in size due to an increase in the number of component parts, the switching elements 201, 202, 203, 204, 201a, 202a, 203a, 204a included in the first, and second DC-DC conversion circuits 101, 101a are each configured of a wide band gap semiconductor using a silicon carbide- or gallium nitride-based material higher in switching speed than silicon, and thereby it is possible to realize a reduction in the size of the power conversion device 200.

The circuit configuration of the first and second DC-DC conversion circuits 101, 101a may be of a half-bridge type, and the method of controlling the switching elements included in the control units 111, 111a may be a hard-switching method. Also, the control units 111, 111a may cause the currents distributed by interleaving to converge outside the casing 102.

Third Embodiment

Next, a description will be given of a power conversion device according to the third embodiment.

Figure 3:
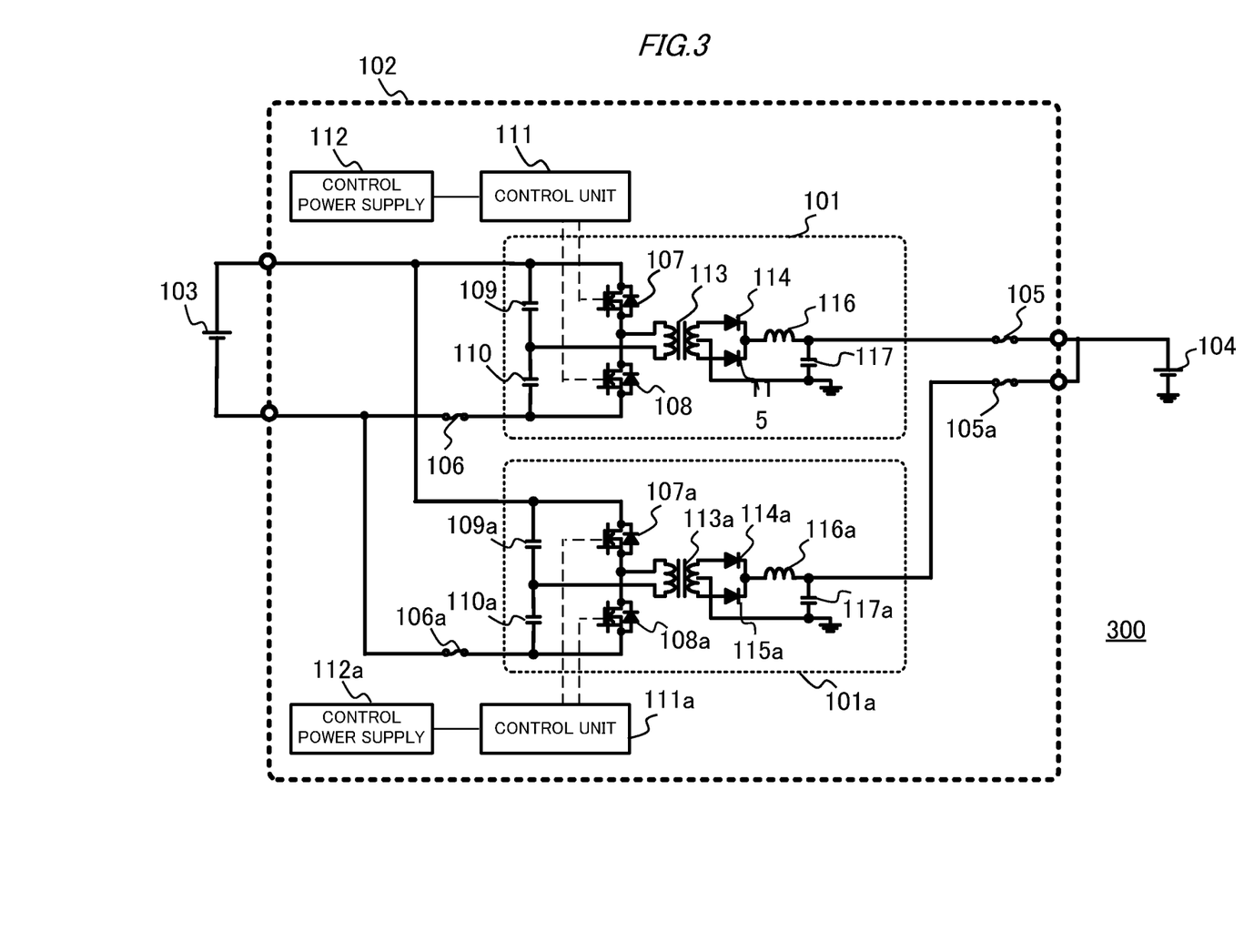
FIG. 3 is a schematic configuration diagram showing a power conversion device according to the third embodiment.

FIG. 3 is a schematic configuration diagram showing the power conversion device according to the third embodiment. In a power conversion device 300 according to the third embodiment, a first DC-DC conversion circuit 101, which is a first power conversion circuit, and a second DC-DC conversion circuit 101a, which is a second power conversion circuit, are provided connected in parallel inside one casing 102. The respective primary sides of the first and second DC-DC conversion circuits 101, 101a are connected to a DC power supply 103, and the respective secondary sides of the first and second DC-DC conversion circuits 101, 101a are connected to a load 104. Fuses 106, 106a are connected between the respective primary sides of the first and second DC-DC conversion circuits 101, 1011a and the casing 102, and fuses 105, 105a are connected between the respective secondary sides of the first and second DC-DC conversion circuits 101, 101a and the casing 102.

Switching elements 107, 108 are each on/off controlled by a control unit 111, and the control unit 111 is supplied with power by a control power supply 112. Also, switching elements 107a, 108a are each on/off controlled by a control unit 111a, and the control unit 111a is supplied with power by a control power supply 112a. The other components are the same as in the first embodiment, and are given the identical signs, thereby omitting the description thereof.

The power conversion device 300 according to the third embodiment is configured as heretofore mentioned, and with the fuses 106, 106a, for example, when either the first or second DC-DC conversion circuit 101, 101a short-circuits, it is possible to prevent a short circuit current from flowing into the DC power supply 103, while as there is no need to include a short circuit current preventer on the DC power supply 103 side, it is possible to carry out a reduction in the number of parts on the DC power supply 103 side. For example, when the power conversion device 300 is used in an electric vehicle, it is possible to carry out a reduction in the number of parts on the electric vehicle side, and possible to realize a reduction in the size of electric vehicle component parts.

Also, with the fuses 105, 105a, for example, when either the first or second DC-DC conversion circuit 101, 101a short-circuits, it is possible to prevent a short circuit current from flowing into the load 104, while as there is no need to include a short circuit current preventer on the load 104 side, it is possible to carry out a reduction in the number of parts on the load 104 side. For example, when the power conversion device 300 is used in an electric vehicle, it is possible to carry out a reduction in the number of parts on the electric vehicle side, and possible to realize a reduction in the size of electric vehicle component parts.

On the respective primary sides of the first and second DC-DC conversion circuits 101, 101a, the fuses 106, 106a may be connected between the outside of the casing 102 and the DC power supply 103. Also, on the respective secondary sides of the first and second DC-DC conversion circuits 101, 101a, when the control units 111, 111a because the currents distributed by interleaving to converge outside the casing 102, the fuses 105, 105a may be connected between the outside of the casing 102 and the load 104. Furthermore, the control units 111, 111a may cause the currents distributed by interleaving to converge outside or inside the casing 102.

Fourth Embodiment

Next, a description will be given of a power conversion device according to the fourth embodiment.

Figure 4:
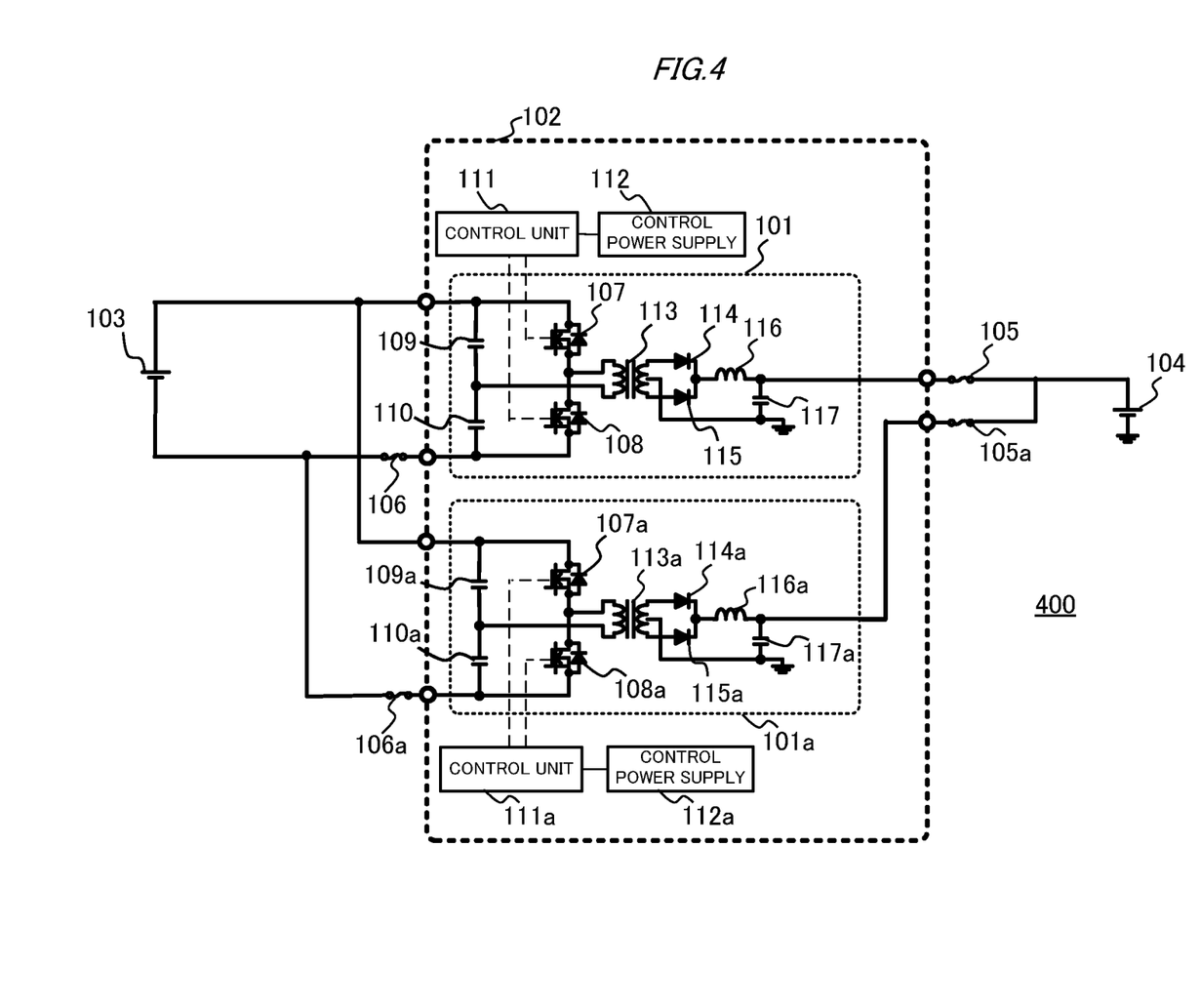
FIG. 4 is a schematic configuration diagram showing a power conversion device according to the fourth embodiment.

FIG. 4 is a schematic configuration diagram showing the power conversion device according to the fourth embodiment. In a power conversion device 400 according to the fourth embodiment, a first DC-DC conversion circuit 101, which is a first power conversion circuit, and a second DC-DC conversion circuit 101a, which is a second power conversion circuit, are provided connected in parallel inside one casing 102. On the respective primary sides of the first and second DC-DC conversion circuits 101, 101a, fuses 106, 106a are connected between the outside of the casing 102 and a DC power supply 103, and on the respective secondary sides of the first and second DC-DC conversion circuits 101, 101a, fuses 105, 105a are connected between the outside of the casing 102 and a load 104. The other components are the same as in the third embodiment, and are given the identical signs, thereby omitting the description thereof.

The power conversion device 400 according to the fourth embodiment is configured as heretofore mentioned, and with the fuses 106, 106a, for example, when either the first or second DC-DC conversion circuit 101, 101a short-circuits, it is possible to prevent a short circuit current from flowing into the DC power supply 103, while as there is no need to include a short circuit current preventer in the power conversion device 400, it is possible to carry out a reduction in the number of parts of the power conversion device 400, and possible to realize a reduction in the size thereof.

Also, with the fuses 105, 105a, for example, when either the first or second DC-DC conversion circuit 101, 101a short-circuits, it is possible to prevent a short circuit current from flowing into the load 104, while as there is no need to include a short circuit current preventer in the power conversion device 400, it is possible to carry out a reduction in the number of parts of the power conversion device 400, and possible to realize a reduction in the size thereof.

The fuses 106, 106a may be connected between the respective primary sides of the first and second DC-DC conversion circuits 101, 101a and the casing 102. Also, the fuses 105, 105a may be connected between the respective secondary sides of the first and second DC-DC conversion circuits 101, 101a and the casing 102, and at this time, the control units 111, 111a may cause the currents distributed by interleaving to converge inside the casing 102.

Fifth Embodiment

Next, a description will be given of a power conversion device according to the fifth embodiment.

Figure 5:
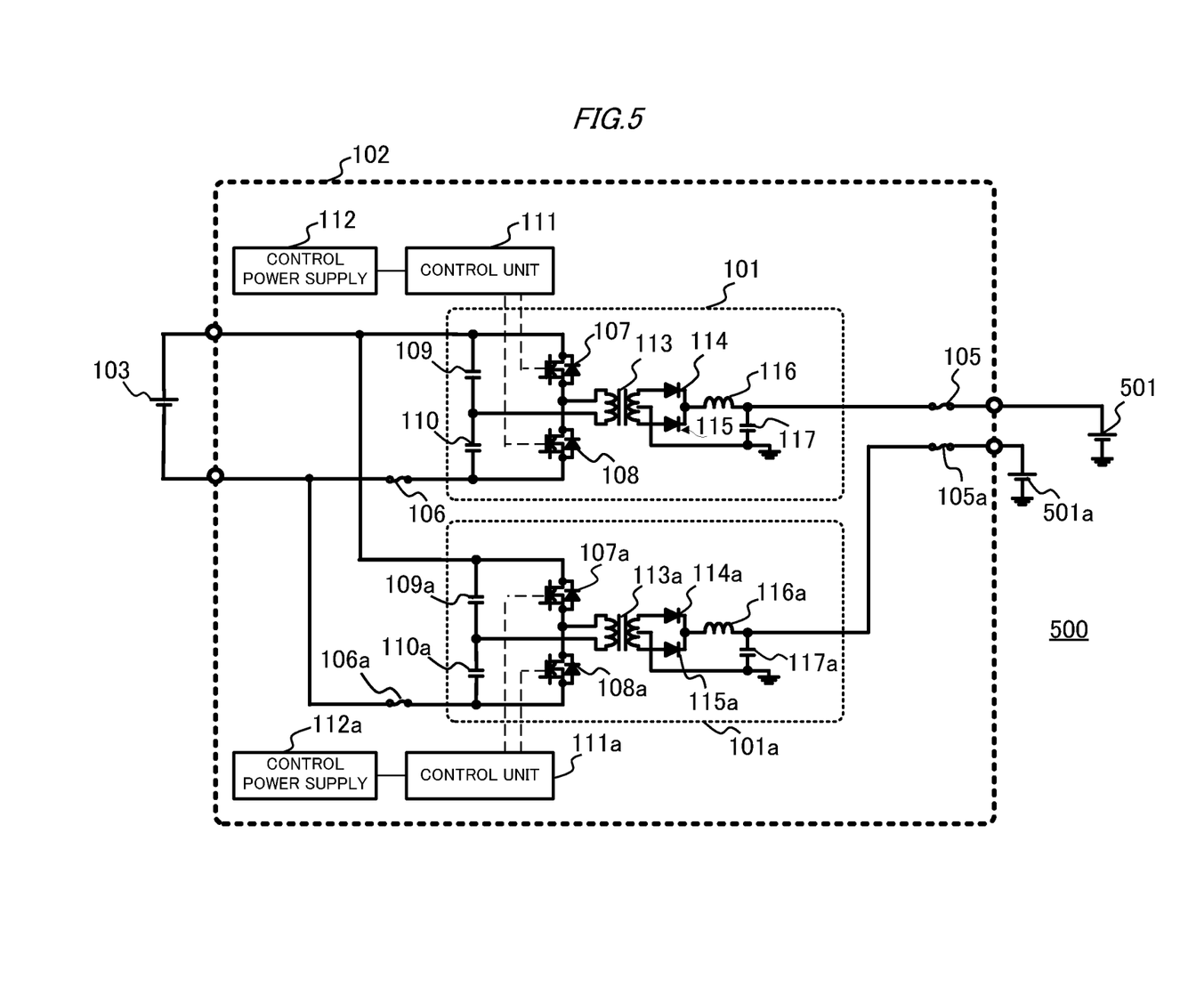
FIG. 5 is a schematic configuration diagram showing a power conversion device according to the fifth embodiment.

FIG. 5 is a schematic configuration diagram showing the power conversion device according to the fifth embodiment. In a power conversion device 500 according to the fifth embodiment, a first DC-DC conversion circuit 101, which is a first power conversion circuit, and a second DC-DC conversion circuit 101a, which is a second power conversion circuit, are provided connected in parallel inside one casing 102. A first load 501 (for example, a battery) is connected to the secondary side of the first DC-DC conversion circuit 101, and a second load 501a (for example, a battery) is connected to the secondary side of the second DC-DC conversion circuit 101a. The other components are the same as in the third embodiment, and are given the identical signs, thereby omitting the description thereof.

The power conversion device 500 according to the fifth embodiment is configured as heretofore mentioned, wherein, for example, the first load 501 and the second load 501a have equivalent performance, and even when either one of the DC-DC conversion circuits fails, the operation of a faulty DC-DC conversion circuit is stopped, while only a DC-DC conversion circuit which carries out a normal operation is caused to operate, and thereby it is possible to realize the continuation of power supply of the power conversion device 500.

In the third, fourth, and fifth embodiments, the circuit configuration of the first and second DC-DC conversion circuits 101, 101a is illustrated to be of a half-bridge type, but may be of a full-bridge type, and the method of controlling the switching elements 107, 108, 107a, 108a of the control units 111, 111a may be a hard-switching method or a soft-switching method.

The rectifier elements 114, 115, 114a, 115a included in the first and second DC-DC conversion circuits 101, 101a in each of the heretofore mentioned embodiments may each use a switching element. Also, the first and second DC-DC conversion circuits 101, 101a may each be a DC-AC conversion circuit or an AC-DC conversion circuit.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A power conversion device, comprising:
a plurality of power conversion circuits which are provided inside a single casing and connected in parallel to each other;
a plurality of controllers which carry out control of respective power conversion circuits from among the plurality of power conversion circuits; and
a plurality of control power supplies which carry out the supply of power to respective controllers from among the plurality of controllers, wherein
the plurality of power conversion circuits each include:
a transformer having a primary winding and a secondary winding;
semiconductor switching elements connected to the primary winding;
rectifier circuits connected to the secondary winding;
a smoothing reactor connected to the output side of the rectifier circuits; and
a smoothing capacitor connected between the smoothing reactor and the ground, and wherein
the plurality of power conversion circuits are controlled independently of each other.

2. The power conversion device according to claim 1, wherein
the plurality of power conversion circuits each include fuses at either the previous or subsequent stage or at both the previous and subsequent stages.

3. The power conversion device according to claim 2, wherein
the fuses are provided inside the casing.

4. The power conversion device according to claim 2, wherein
the fuses are provided outside the casing.

5. The power conversion device according to claim 1, wherein
the plurality of power conversion circuits are interleaved driven.

6. The power conversion device according to claim 5, wherein
currents distributed by the interleaved drive are caused to converge inside the casing.

7. The power conversion device according to claim 5, wherein
currents distributed by the interleaved drive are caused to converge outside the casing.

8. The power conversion device according to claim 1, wherein
the respective controllers and respective control power supplies are both provided independently for each power conversion circuit from among the plurality of power conversion circuits.

9. The power conversion device according to claim 1, wherein
each controller from among the plurality of controllers causes the respective power conversion circuit from among the plurality of power conversion circuits to operate with a load distributed into the plurality of power conversion circuits so as to maximize efficiency, or stops the operation of a specific one of the plurality of power conversion circuits.

10. The power conversion device according to claim 1, wherein
the plurality of power conversion circuits are driven by a hard-switching method.

11. The power conversion device according to claim 1, wherein
the plurality of power conversion circuits are driven by a soft-switching method.

12. The power conversion device according to claim 10, wherein
the plurality of power conversion circuits are configured as half bridge.

13. The power conversion device according to claim 11, wherein
the plurality of power conversion circuits are configured as half bridge.

14. The power conversion device according to claim 10, wherein
the plurality of power conversion circuits are configured as full bridge.

15. The power conversion device according to claim 11, wherein
the plurality of power conversion circuits are configured as full bridge.

16. The power conversion device according to claim 1, wherein
the switching elements are each a wide band gap semiconductor using a silicon carbide or gallium nitride-based material.

* * * * *